United States Patent [19]
Yamashita et al.

[11] Patent Number: 6,052,351
[45] Date of Patent: Apr. 18, 2000

[54] DISK DEVICE

[75] Inventors: Tatsumaro Yamashita, Miyagi-ken; Sadayuki Ishii, Fukushima-ken, both of Japan

[73] Assignee: ALPS Electric Co., Ltd., Tokyo, Japan

[21] Appl. No.: 09/008,894

[22] Filed: Jan. 20, 1998

[30] Foreign Application Priority Data

Jan. 23, 1997 [JP] Japan .................................. 9-009942

[51] Int. Cl.⁷ .................................................. G11B 33/02
[52] U.S. Cl. ........................................ 369/75.2; 369/77.1
[58] Field of Search ............................... 360/99.06, 77.2, 360/98.08; 369/77.2, 75.2, 75.1, 77.1

[56] References Cited

U.S. PATENT DOCUMENTS

| | | | |
|---|---|---|---|
| 4,622,607 | 11/1986 | Smith, II | 360/97 |
| 4,899,238 | 2/1990 | Inoue et al. | 360/99.06 |
| 5,146,447 | 9/1992 | Nagasato et al. | 369/77.2 |
| 5,355,359 | 10/1994 | Lee | 369/77.2 |
| 5,448,434 | 9/1995 | Hirose | 360/99.01 |
| 5,808,997 | 9/1998 | Yamamiya | 369/77.2 |

FOREIGN PATENT DOCUMENTS

| | | |
|---|---|---|
| 0 447 248 A2 | 9/1991 | European Pat. Off. . |
| 0 509 531 A2 | 10/1992 | European Pat. Off. . |
| 0 518 259 A2 | 12/1992 | European Pat. Off. . |
| 0 696 797 A2 | 2/1996 | European Pat. Off. . |
| 05303816 | 11/1993 | Japan . |
| WO 96/24931 | 8/1996 | Japan . |

*Primary Examiner*—David L. Ometz
*Assistant Examiner*—Angel Castro
*Attorney, Agent, or Firm*—Brinks Hofer Gilson & Lione

[57] ABSTRACT

A disk device including a guide, formed in a housing, having an inclined guide portion and a straight-line guide portion. A moving member moves along the guide. The moving member is affixed to a wire, and the wire is wound upon a biasing pulley. A small-diameter pulley is formed integrally with the biasing pulley, and a spring is provided at a biasing wire wound upon the small-diameter pulley. When the moving member is pushed into the disk device by a cartridge, the shutter is opened. The moving member is also used to eject the cartridge. Even when the resilient force of the spring is large, the reaction force, produced as a result of cartridge insertion, is small, and the ejection stroke of the cartridge is large. In a conventional disk device for loading a cartridge therein, both a mechanism for opening the shutter of the cartridge, and a mechanism for ejecting the cartridge are required. When these mechanisms are formed into a single mechanism, the reaction force, produced when inserting the cartridge, is large, and a sufficiently long ejection stroke cannot be obtained. The disk device of the invention makes it possible to overcome these problems.

3 Claims, 7 Drawing Sheets

DISK DEVICE

BACKGROUND OF THE INVENTION

1. Field of the Invention

The present invention broadly relates to a disk device for inserting a disk-containing cartridge therein, and, more particularly, to a disk device allowing a shutter of a cartridge, inserted by a simple mechanism, to be opened, and the cartridge to be ejected.

2. Description of the Related Art

Figure 7A:
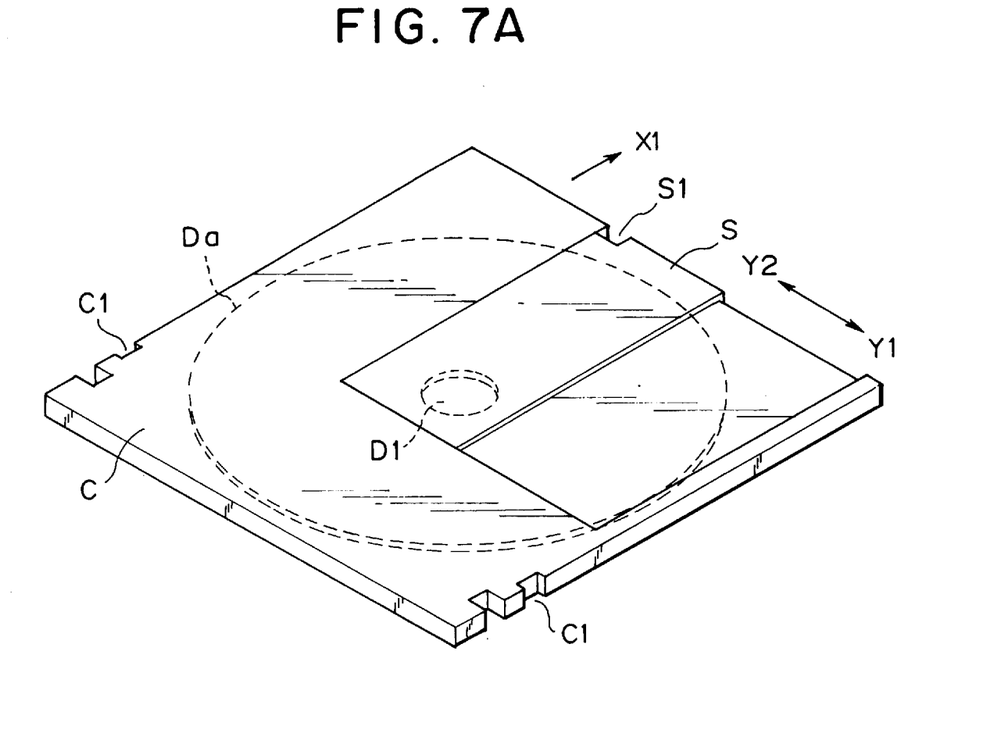

There are recording media to which data can be recorded, using an optical recording method, a magneto-optical recording method, or a phase-change recording method. An example of such recording media is a disk Da contained in a cartridge C, which is shown in FIG. 7A.

The cartridge C has a shutter S at a side portion at an X1 side, with the shutter S being slidable in the Y1–Y2 directions and being biased in the Y2 direction by a spring. When the shutter S slides in the Y2 direction, the window of the cartridge C is closed, whereas when the shutter S moves in the Y1 direction, the window is opened.

The disk device for inserting the cartridge C therein requires a shutter opening mechanism for opening the shutter S by making it slide in the Y1 direction, as well as an ejection mechanism for pushing out the cartridge C from the opening, after reproduction.

However, separately providing the aforementioned shutter opening mechanism and the aforementioned ejection mechanism makes the structure of the drive device very complicated.

To overcome such a problem, as shown in FIG. 7A, a rotary lever 61, serving as both a shutter opening mechanism and an ejection mechanism, may be provided in the device in the direction of insertion of the cartridge (X1 direction). The base end of the rotary lever 61 is rotatably supported by a supporting shaft 62 as fulcrum, with a biasing pin 63 provided at an end of the rotary lever 61. The rotary lever 61 is biased in the α1 direction by a spring.

When the cartridge C is inserted in the X1 direction, the biasing pin 63 is retained by an end S1 of the shutter S. Further insertion of the cartridge C in the X1 direction causes the rotary lever 61 to rotate in the α2 direction, during which rotation the biasing pin 63 pushes the shutter S in the Y1 direction to open it.

After reproduction of data on the disk Da in the cartridge, the rotary lever 61 is rotated in the Y2 direction by the spring in order to eject the cartridge C.

However, as shown in FIG. 7A, the rotary lever 61 is provided at the back side of the disk device, so that there is a limit as to how long the rotary lever 61 can be made. Therefore, when ejecting the cartridge C, the ejection stroke of the cartridge C, during rotation of the rotary lever 61 in the α1 direction, is short, making it difficult to ensure ejection of the cartridge C out the disk device.

At the moment the cartridge C is inserted in the X1 direction, and the biasing pin 63 strikes the end S1 of the shutter S, the rotary lever 61 extends in the X1 direction. Therefore, immediately after the biasing pin 63 has struck the end S1 of the shutter S, the reaction force, produced during rotation of the biasing pin 63 in the α2 direction, is large, so that there is a large force that opposes the insertion of the cartridge C.

SUMMARY OF THE INVENTION

To overcome the above-described conventional problems, it is an object of the present invention to provided a disk device capable of reliably opening the shutter, in which the force opposing cartridge insertion is small, and the push-out stroke, during ejection of the cartridge, is long.

To this end, according to the present invention, there is provided a disk device for inserting a cartridge (C), including a shutter (S) for opening and closing a window to expose the inner portion of a disk (Da), into an opening (4), with a side portion of the disk device with the shutter (S) set facing the inner portion of the disk device, and an opening direction of the shutter (S) set in the widthwise direction of the disk device, the disk device comprising: a guide (6) having a guide portion (6a) and a guide portion (6b), the guide portion (6a) extending from the opening (4) towards the back side (or in an X1 direction) of the disk device, and in the opening direction (or in a Y1 direction) of the shutter (S), and the guide portion (6b) extending continuously from the guide portion (6a) towards the back side (or in the X1 direction) of the disk device; a moving member (7) which moves along the guide (6); a biasing member (13) for biasing the moving member (7) in the direction of the opening (4); and positioning members (53, 54) for positioning the cartridge (C), inserted by pushing the cartridge (C) by the moving member (7), to a position where the disk (Da) is drivable, wherein when the moving member (7) is moving to the opening (4) side end of the guide (6), an end (S1) at the shutter (S) closing side of the cartridge (C) to be inserted is retained by the moving member (7).

Although not exclusive, the disk device may further comprise a wire (14) which moves along the guide (6), the wire (14) having the moving member (7) affixed thereto, and the wire (14) being biased in a direction that allows the moving member (7) to move towards the opening (4) side.

Although not exclusive, the disk device may further comprise a biasing pulley (10) having the wire (14) wound thereupon, and a small-diameter pulley (11) which rotates with the biasing pulley, and having a biasing torque, produced by a biasing force of the biasing member (13), exerted thereto.

According to the present invention, when the cartridge (C) is inserted, the movable member (7), pushed by the cartridge (C), moves along the guide (6) towards the back side of the drive device. When the moving member (7) moves along the first guide portion (6a) extending obliquely, the shutter (S) is opened by the force produced by the movement of the moving member (7). After the shutter (S) has been opened, the moving member (7) moves along the second guide portion (6b) extending in a straight line towards the back side of the disk drive (or in a direction parallel to the direction of insertion of the cartridge), during which the shutter S is kept open.

Thus, the movement stroke of the shutter (S) is long, so that the cartridge (C) can be ejected out of the device with a sufficiently long ejection stroke. Consequently, after ejection, the cartridge can be easily pulled out.

In addition, the moving member (7) is always guided along the guide (6), allowing smooth movement of the moving member (7).

Further, when the moving member (7), affixed to the wire (14), moves along with the wire, a stable biasing force is exerted to the moving member (7) in the direction of the opening. In particular, a stable and proper amount of biasing force can be exerted to the moving member (7), using a short biasing member (coil spring) (13), by providing a biasing pulley (10), with the wire (14) wound thereupon, and a small-diameter pulley (11) having a smaller diameter than that of the biasing pulley (10). Further, a short spring, or the like, may be used for the biasing member, thereby simplifying the structure in the device, and providing a structure suitable for size reduction.

Still further, although in the illustrated example the small-diameter pulley (11) is integrally provided with the biasing pulley (10) upon which the wire (14) is wound, in the present invention the resilient force of the spring, serving as the biasing member (13), may be applied to the moving member (7) either through the wire or directly thereto, by means of a speed-increasing means.

BRIEF DESCRIPTION OF THE DRAWINGS

FIG. 2A is a plan view primarily showing the top half of the disk device, while

FIG. 3A is a plan view primarily showing the bottom half of the disk device, while

FIG. 7A is a perspective view showing a disk-containing cartridge, while

DESCRIPTION OF THE PREFERRED EMBODIMENT

Figure 1:
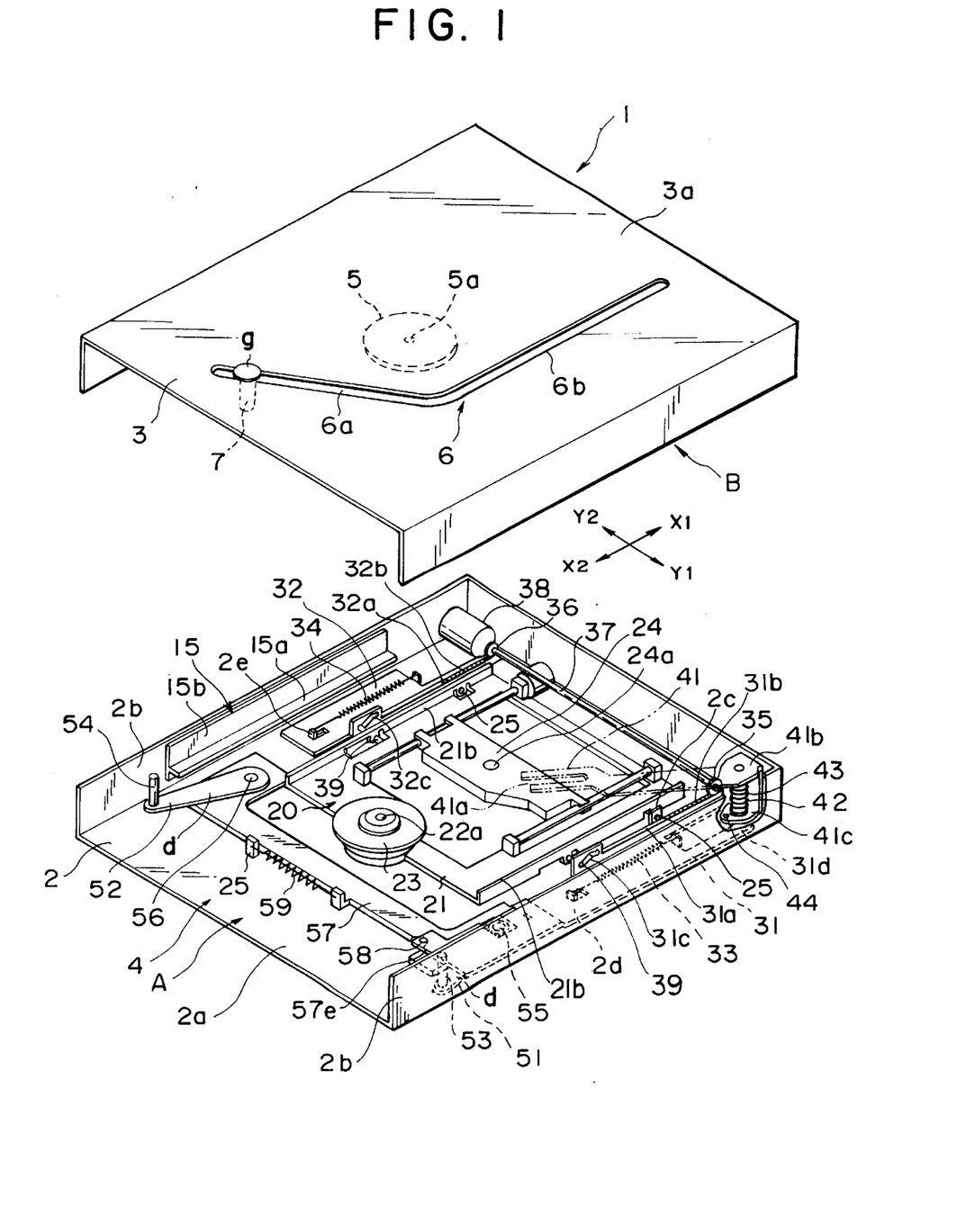
FIG. 1 is an exploded perspective view of a disk device of the present invention.
Figure 2A:
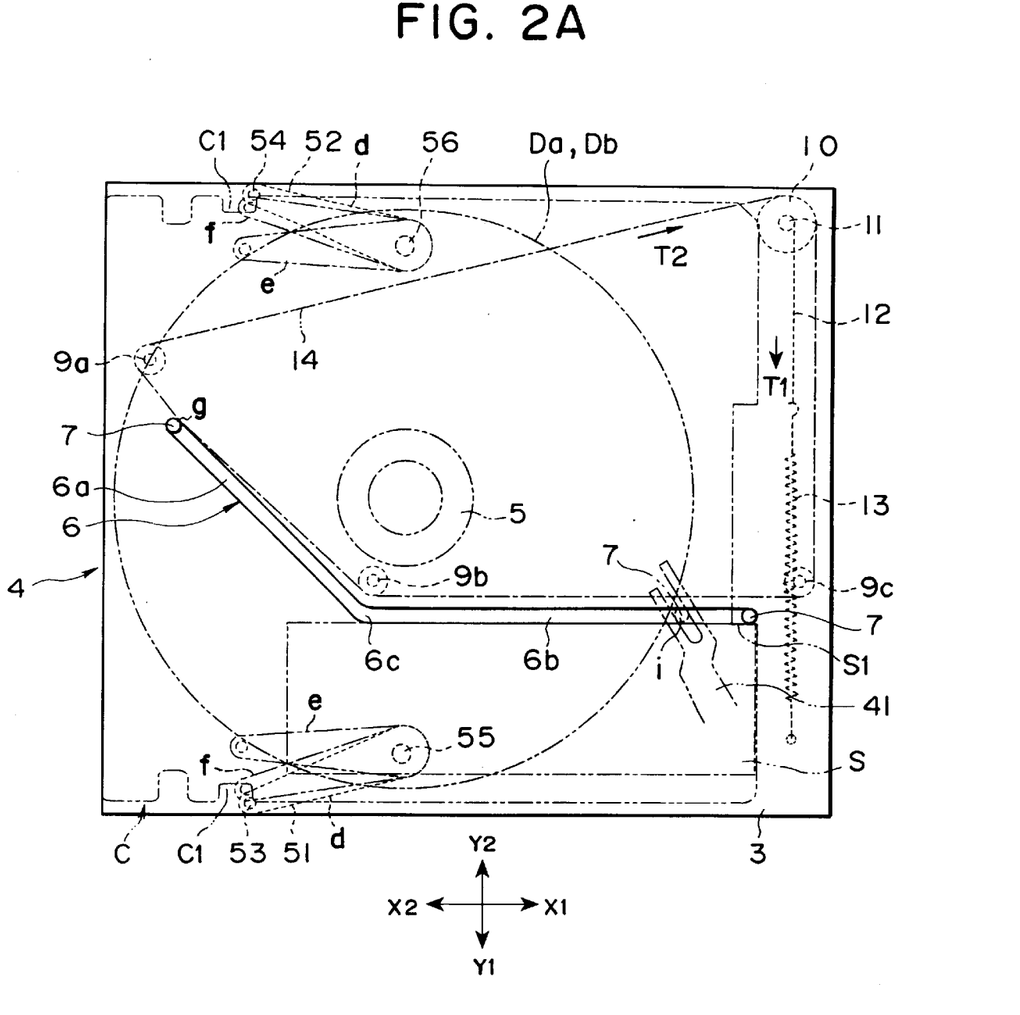
Figure 2B:
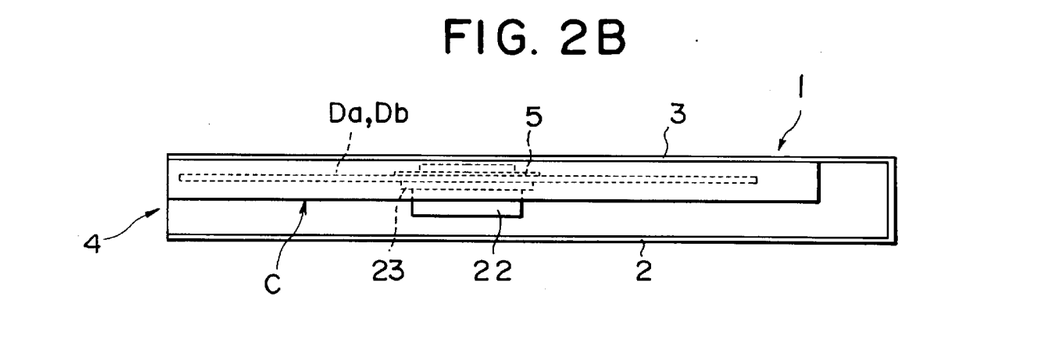
FIG. 2B is a side elevational view showing the disk device.
Figure 3A:
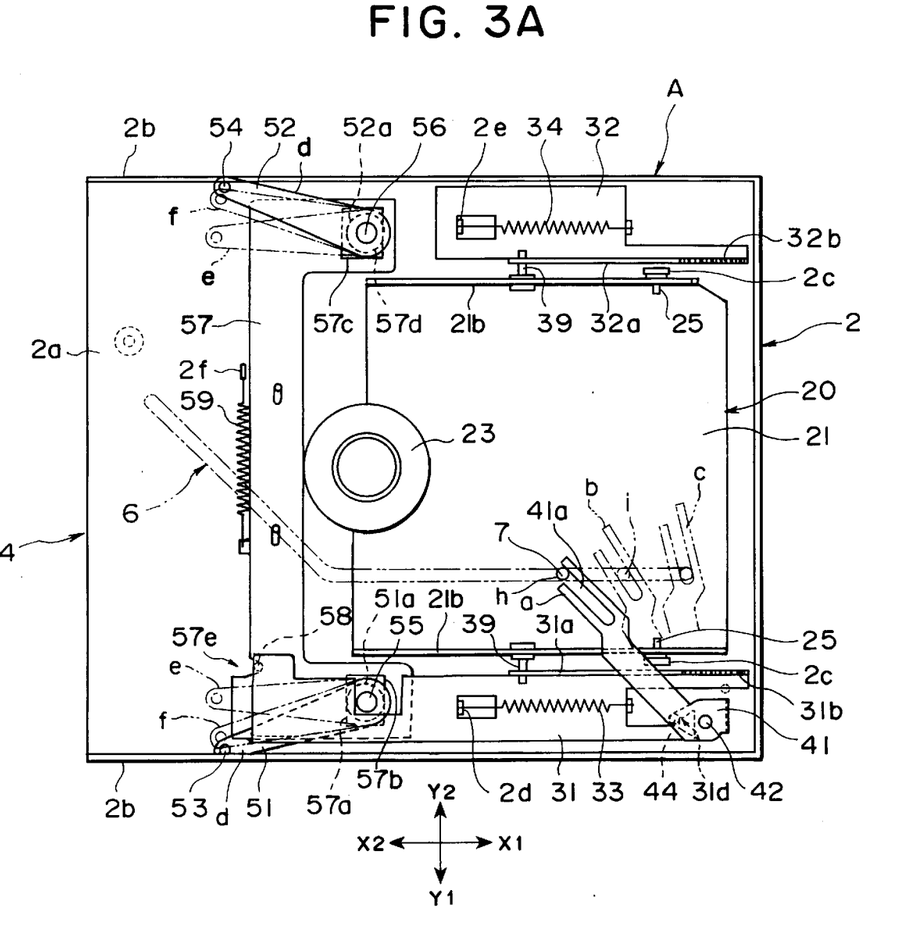
Figure 3B:
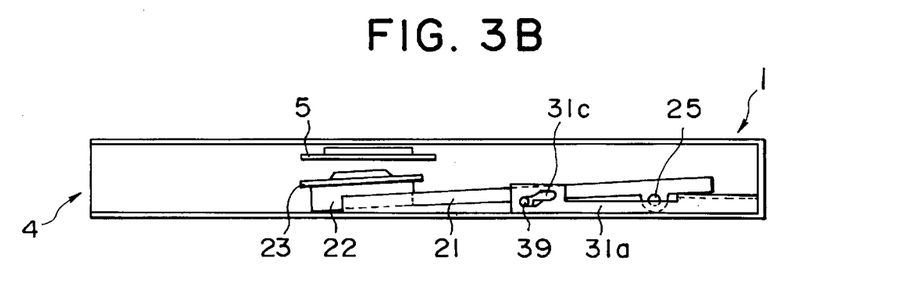
FIG. 3B is a side elevational view of the disk device.
Figure 4A:
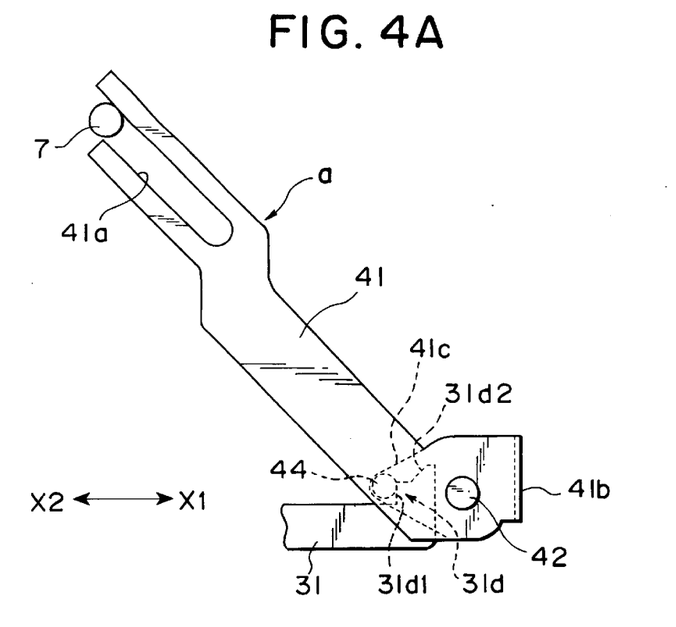
FIGS. 4A and 4B are partial plan views each showing the lock releasing member rotated to a different rotational angle.
Figure 4B:
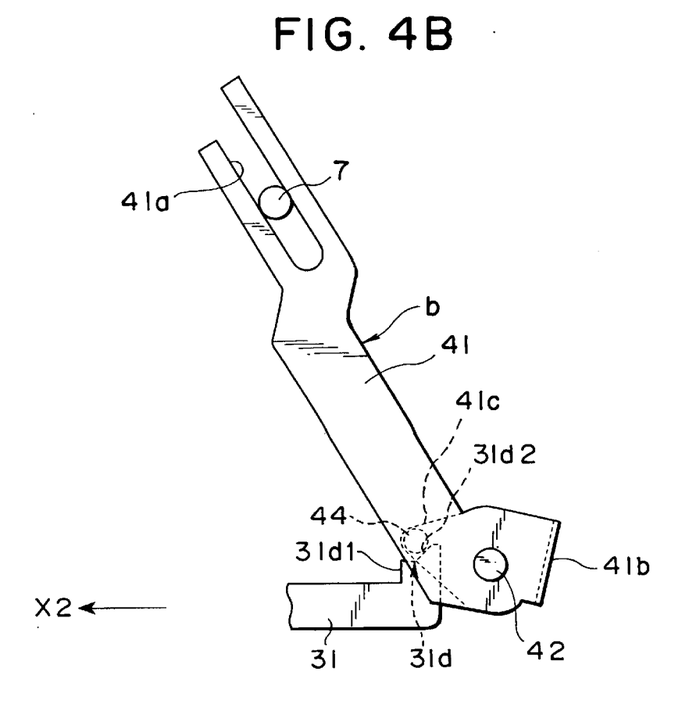
Figure 5:
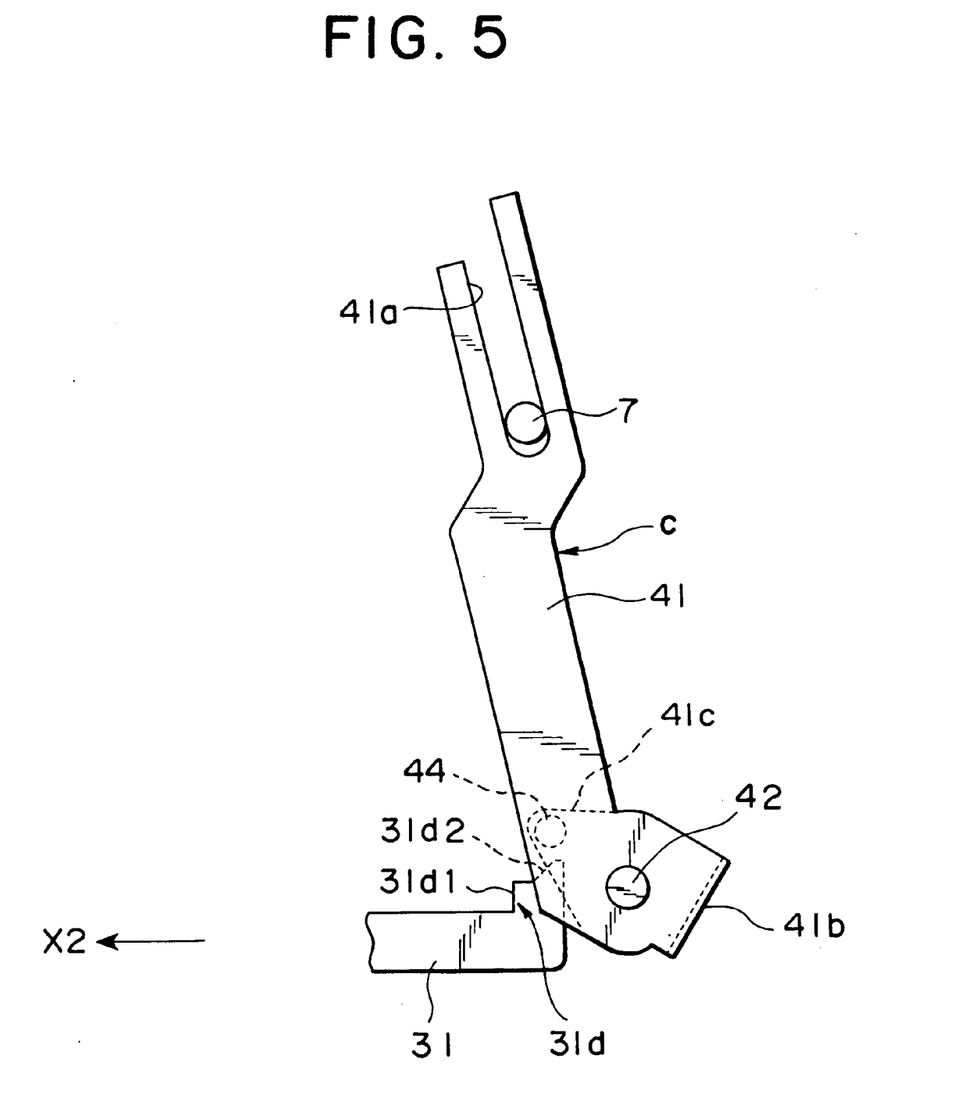
FIG. 5 is a partial plan view showing the lock releasing member rotated by the largest amount in the clockwise direction.
Figure 6A:
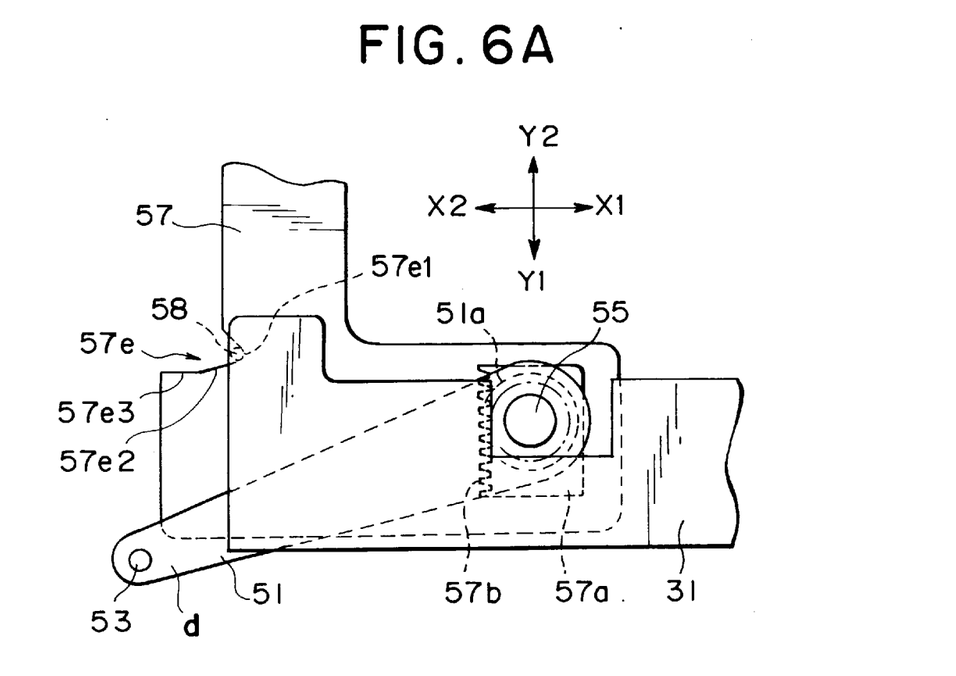
FIGS. 6A and 6B are partial plan views each showing the positioning arm driven to a different position by the control member.
Figure 6B:
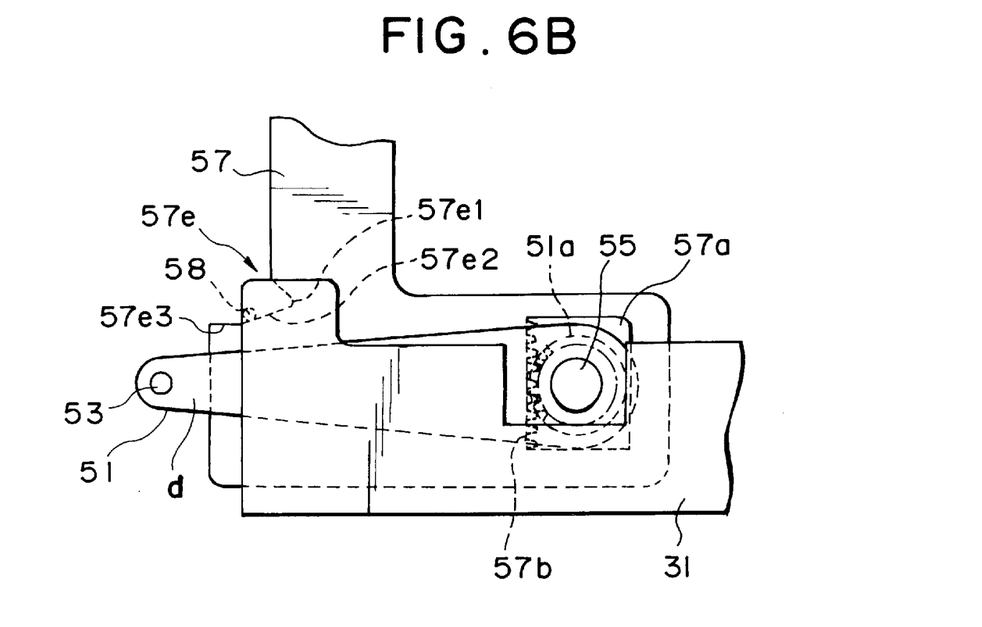

FIG. 1 is an exploded perspective view of a disk device in accordance with the present invention. FIG. 2A is a plan view primarily showing the structure of the upper half B of the disk device, while FIG. 2B is a side elevational view of the disk device. FIG. 3A is a plan view primarily showing the structure of the lower half A of the disk device, while FIG. 3B is a side elevational view of the disk device. FIGS. 4 to 6 are partial views each illustrating the operation of the disk device.

Figure 7B:
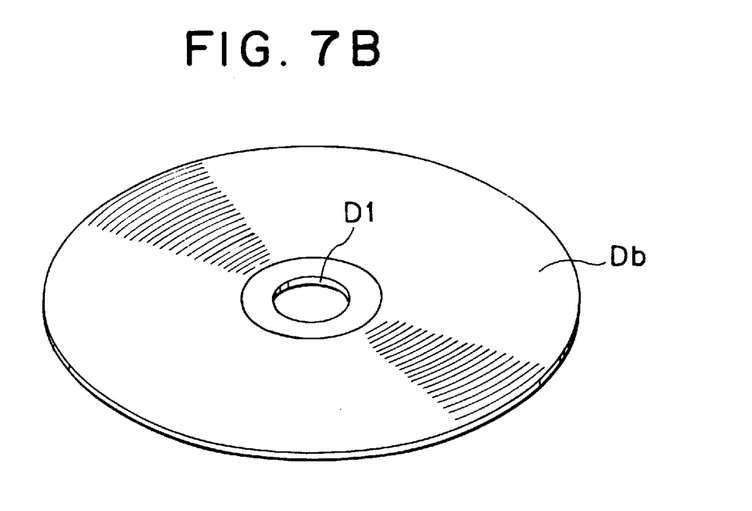
FIG. 7B is a perspective view showing a disk not contained in a cartridge.

Either a cartridge C containing a disk Da, such as that shown in FIG. 7A, or a disk Db not contained in a cartridge, such as that shown in FIG. 7B, can be loaded into the disk device of the present invention. Examples of the disk Da, contained in the cartridge C, and the disk Db, not contained in a cartridge, include a power disk (PD), a digital video disk (DVD), and a compact disk-read only memory (CD-ROM).

As shown in FIG. 1, the disk device comprises a lower half A and an upper half B. The disk device, formed by combining the lower half A and the upper half B, is a thin device, as shown in FIGS. 2B and 3B.

The housing 1 of the disk device is divided into a lower housing portion 2 of the lower half A, and an upper housing portion 3 of the upper half B. Combining the lower housing portion 2 and the upper housing portion 3 forms a thin, box-shaped housing 1, as shown in FIGS. 2A and 3B, with an opening 4 formed in the left side of the housing 1 in the figures. Either the cartridge C of FIG. 7A or the disk Db of FIG. 7B is inserted into the housing 1 in the X1 direction from the opening 4.

As shown in FIG. 1, at a top plate 3a of the upper housing portion 3, a clamper 5 is rotatably supported by a shaft 5a, and the shaft 5a and the clamper 5 are resiliently pushed towards the lower housing portion 2 by means of a plate spring (not shown).

A guide 6 is formed in the top plate 3a of the upper housing portion 3 of the upper half B. The guide 6, which is slot-shaped, has, at the opening 4 side, an oblique guide portion 6a that extends in the X1 direction (or in the direction of insertion of the cartridge C or the like) and obliquely in the Y1 direction (or in a direction perpendicular to the direction of insertion); and a straight-line guide portion 6b that extends continuously with the oblique guide portion 6a and parallel to the X1 direction. A pin-shaped moving member 7, being an opening/ejecting member, is inserted into the guide 6, so as to be movable in the slot of the guide 6.

As shown in FIG. 2A, small pulleys 9a, 9b, and 9c are rotatably supported at the lower surface of the top plate 3a of the upper housing portion 3. A biasing pulley 10 is rotatably supported at a corner at the X1 and Y2 sides of the upper housing portion 3. A wire 14 is placed upon the small pulleys 9a, 9b, and 9c, and is also wound upon the biasing pulley 10 so that the wire 14 moves in response to the rotation of the biasing pulley 10. The moving member 7 is affixed to a portion of the wire 14.

A small-diameter pulley 11 is integrally formed with the biasing pulley 10, with an end of a biasing wire 12 affixed to the small-diameter pulley 11, and the biasing wire 12 wound upon the small-diameter pulley 11. An ejection spring 13, serving as a biasing member, is placed between the other end of the biasing wire 12 and the upper housing portion 3. The biasing wire 12 is pulled by the contraction force of the ejection spring 13, so that the small-diameter pulley 11 and the biasing pulley 10 formed integrally therewith are biased clockwise. This biases the wire 14 so as to move in the clockwise direction. The moving member 7, affixed to the wire 14, is pushed against an end at the opening 4 side of the guide 6.

A biasing torque is exerted onto the small-diameter pulley 11 in the clockwise direction by the pulling resilient force of the ejection spring 13. The wire 14 is also wound upon the large-diameter biasing pulley 10. Thus, since there is a difference between the diameters of the biasing pulley 10 and the small-diameter pulley 11, the dimension in the direction of expansion and contraction of the ejection spring 13 is short, while the distance through which the moving member 7 moves along the guide 6 is long. Therefore, it is possible to use an ejection spring 13 which is short compared to the distance of movement of the moving member 7, and, as shown in FIG. 2A, the ejection spring 13 can be disposed so as to extend in the widthwise direction (or Y direction) of the upper housing 3. In addition, tension T2, exerted onto the wire 14 by the biasing pulley 10, is less than tension T1, exerted onto the biasing wire 12 by the ejection spring 13, so that when either the cartridge C or the disk Db is inserted from the opening 4, causing the moving member 7 to be pushed in the X1 direction, the opposing force, applied to the cartridge C or the disk Db by the moving member 7, is small. Thus, the cartridge C or the disk Db can be pushed into the housing 1 from the opening 4 lightly with a small force.

As shown in FIG. 1, guide members 15 are affixed to both of the inner sides of side plates 2b of the lower housing portion 2 of the lower half A. It is to be noted than only the guide member 15, affixed to one of the side plates 2b, is shown in FIG. 1. Each guide member 15 is made of a synthetic resin material with a small coefficient of friction, and has a lower guide wall 15a which supports the lower surface of the cartridge C or the disk Db, and a side guide wall 15b which guides a side portion of the cartridge C or the disk Db and which is integrally formed with the lower guide wall 15a. Each lower guide wall 15a is located at about the center of its associated guide member 15, as viewed in the direction of the height of its associated side plate 2b of the lower housing portion 2. As shown in FIG. 2B, the cartridge C or the disk Db, inserted from the opening 4, is guided to an upper area in the housing 1 by the guide member 15.

As shown in FIG. 1, a unit chassis 21 for a disk drive unit 20 is provided on a bottom plate 2a of the lower housing portion 2. As shown in FIG. 3B, the unit chassis 21 is formed by molding and bending a sheet metal material into a C shape. A thin spindle motor 22, shown in FIG. 3B, is affixed to an end at the opening 4 side, with a turntable 23 affixed to a rotary shaft 22a of the spindle motor 22. The clamper 5, disposed below the top plate 3a of the upper housing portion 3, is located directly above the turntable 23. An optical head 24 is supported at the unit chassis 21 so as to be movable in the X1 and X2 directions, and has an objective lens 24a. A sled motor (not shown) for moving the optical head 24 in the X1–X2 directions is disposed on the unit chassis 21.

Supporting shafts 25 are inserted into both side plates 21b of the unit chassis 21 at the back side (X1 side) of the device. Supporting pieces 2c are cut up from the bottom plate 2a of the lower housing portion 2, with the supporting shafts 25 affixed to the supporting pieces 2c. This allows the unit chassis 21 for the disk drive unit 20 to rotate freely on the supporting shafts 25, as fulcra, at the back side of the device.

A pair of plate-shaped control members 31 and 32 are formed on the bottom plate 2a of the lower housing portion 2 so as to be slidable in the X1–X2 directions. A coil spring 33, serving as a biasing member, is placed between the control member 31 and a spring-placing piece 2d cut up from the bottom plate 2a of the lower housing portion 2. The coil spring 33 biases the control member 31 in the X2 direction. Similarly, a coil spring 34, serving as a biasing member, is placed between the control member 32 and a spring placing piece 2e cut up from the bottom plate 2a of the lower housing portion 2. The coil spring 34 biases the control member 32 in the X2 direction.

A vertically-rising bent piece 31a is formed integrally with the control member 31, with a rack 31b formed at an end of the bent piece 31a at the X1 side. Similarly, a vertically-rising bent piece 32a is formed integrally with the control member 32, with a rack 32b formed at an end of the bent piece 32a at the X1 side.

As shown in FIG. 1, a shaft 37, extending in the Y direction, is rotatably supported at the X1 side end in the lower housing portion 2. The shaft 37 is supported by the lower housing portion 2 by means of a supporting mechanism (not shown). A gear 35 is affixed to one end of the shaft 37, while a gear 36 is affixed to the other end of the shaft 37. The gear 35 engages the rack 31b of the control member 31, while the gear 36 engages the rack 32b of the control member 32. The pair of control members 31 and 32 are coupled together by the gears 35 and 36, and the shaft 37, such that they can move in synchronism together in the X1–X2 directions.

A restoring motor 38 is disposed at the back side, or X1 side, of the lower housing portion 2. A gear is formed in the output shaft of the restoring motor 38, and engages the gear 36. When electrical power is not applied to the restoring motor 38, the pair of control members 31 and 32 can move in the X2 direction by the resilient force of the coil springs 33 and 34, respectively, regardless of the load of the restoring motor 38. On the other hand, when electrical power is applied to the restoring motor 38, the gears 35 and 36 are driven, and the driving power is transmitted to the racks 31b and 32b, thereby drawing in each of the control members 31 and 32 in the X1 direction.

As shown in FIGS. 1 and 3B, a crank-shaped drive hole 31c, serving as a drive portion for allowing operation of the disk drive unit 20 in the clamping direction, is formed in the bent piece 31a of the control member 31. Similarly, a crank-shaped drive hole 32c, serving also as a drive portion, is formed in the bent piece 32a of the control member 32. Pins 39 are affixed to both of the side plates 21b of the unit chassis 21, and inserted into their respective drive holes 31c and 32c. As shown in FIGS. 1 and 3B, when the control members 31 and 32 move in the X1 direction, drive holes 31c and 32c allow the corresponding pins 39 to move downward, causing the unit chassis 21 to rotate downward upon the supporting shafts 25 as fulcra, so that the turntable 23 is located downwardly of the area for guiding the insertion of either the cartridge C or the disk Db. On the other hand, when the control members 31 and 32 move in the X2 direction, the crank-shaped drive holes 31c and 32 allow the pins 39 to move upward, so that, as shown in FIG. 2B, the unit chassis 21 rotates upward, allowing the disk to be clamped by the turntable 23 and the clamper 5.

A lock releasing member (arm) 41 is provided at the corner at the X1 and Y1 sides of the lower housing portion 2. The base end of the lock releasing member 41 is rotatably supported by a supporting shaft 42. A torsional lock spring 43 is provided on the outer periphery of the supporting shaft 42. By the lock spring 43, the lock releasing member 41 is biased in the counterclockwise direction in the plan view of FIG. 3A, so as to occupy position a (indicated by the solid line in FIG. 3A).

A groove 41a for receiving the moving member 7 is formed in an end of the lock releasing member 41, and, as shown in FIG. 3A, when the moving member 7 slides along the guide 6 towards the back side of the device, it can slide into the groove 41a.

As shown in FIG. 1, a bent portion 41b, which bends towards the bottom plate 2a, is formed at the base end of the lock releasing member 41, and a lock portion 41c, which bends in a direction parallel to the bottom plate 2a, is formed at the lower end of the bent portion 41b. A lock pin 44, serving as a lock member extending in the direction of the bottom plate 2a, is affixed to an end of the lock portion 41c.

As shown in FIGS. 4A and 4B and FIG. 5, a retainer portion 31d is formed at the X1 side end of the control member 31, and comprises a first retainer portion step 31d1 and a second retainer portion step 31d2 which is an inclined side.

When the lock releasing member 41 is rotated to position a, as indicated by the solid line in FIG. 3A, the lock pin 44 is retained by the first retainer portion step 31d1, causing the control member 31, which has moved towards the X1 side, to become locked at that position. When the cartridge C or the disk Db, which is inserted from the opening 4, pushes the moving member 7 towards the back side (or in the X1 direction) of the device, the moving member 7 starts to move into the groove 41a of the lock releasing member 41 at position a. When the moving member 7 is pushed further towards the back side (or in the X1 direction) of the device, the moving member 7 rotates the lock releasing member 41 in the clockwise direction. When the lock releasing member 41 is rotated to position b of FIG. 3A, the lock pin 44 is retained by the second retainer portion step 31d2, as shown in FIG. 4B. Thereafter, when the control member 31 moves in the X2 direction by the resilient force of the coil spring 33, the lock pin 44 is guided to the inclined second retainer portion step 31d2, as a result of which the lock releasing member 41 moves slightly in the clockwise direction from position b.

As mentioned above, when the disk Db is inserted into the device, the lock releasing member 41 rotates to position b, and rotates slightly clockwise from position b, whereas when the cartridge C is inserted into the device, the moving member 7 is pushed to the terminal end of the guide 6 at the X1 side thereof, as a result of which the lock releasing member 41 rotates to position c. FIG. 5 shows the lock releasing member 41 rotated to position c.

At the opening 4 side of the lower housing portion 2, a pair of positioning arms 51 and 52 are provided at both side portions at the Y1 and Y2 sides. Upwardly-extending positioning pins (members) 53 and 54 are affixed to the ends of their respective positioning arms 51 and 52. The base ends of each of the positioning arms 51 and 52 are rotatably supported by their respective supporting shafts 55 and 56 affixed to the bottom plate 2a of the lower housing portion 2.

An interlock lever 57, extending in the Y1–Y2 directions and supported so as to be slidable in the Y1–Y2 directions, is provided between the positioning arms 51 and 52. An interlock spring 59, being a coil spring, is provided between the interlock lever 57 and a supporting piece 2f cut up from the bottom plate 2a. The interlock spring 59 biases the interlock lever 57 in the Y2 direction.

As shown in FIG. 3A, a square hole 57a is formed in the Y1 side end of the interlock lever 57. The supporting shaft 55 that supports the base end of the positioning arm 51 is positioned in the square hole 57a. A rack 57b is formed in the X2 side edge of the square hole 57a, and, a gear 51a and the rack 57b engage each other, with the gear 51a integrally affixed to the base end of the positioning arm 51 with the supporting shaft 55 as center. A square hole 57c is also formed in the Y2 side end of the interlock lever 57. The supporting shaft 56 that supports the base end of the positioning arm 52 is positioned in the square hole 57c. A rack 57d is formed at the X1 side end of the square hole 57c, so that the rack 57d and the rack 57b are formed on opposite sides of their corresponding square holes. A gear 52a is integrally affixed to the base of the positioning arm 52, with the supporting shaft 56 as center, and engages the rack 57d.

When the interlock lever 57 moves in the Y1 direction, engagement of the rack 57b and the gear 51a as well as engagement of the rack 57d and the gear 52a cause the positioning arm 51 to rotate counterclockwise, and the positioning arm 52 to rotate clockwise, so that the positioning pins 53 and 54 move away from each other. On the other hand, when the interlock lever 57 moves in the Y2 direction, the positioning arm 51 rotates clockwise, whereas the positioning arm 52 rotates counterclockwise, causing the positioning pins 53 and 54 to move closer to each other.

As shown in FIGS. 6A and 6B, a restricting portion 57e is formed at the Y side end of the interlock lever 57. The restricting portion 57e comprises a V-shaped valley 57e1, an inclined portion 57e2, and a straight-line portion 57e3 extending in the X1–X2 directions. A restricting pin 58, extending in the direction of the bottom plate 2a, is provided at the X2 side end of the control member 31, and can engage the restricting portion 57e.

FIG. 6A shows the control member 31 moved in the X1 direction by the largest amount. In this state, the restricting pin 58 slides into the valley 57e1 of the restricting portion 57e, and the interlock lever 57 is moved in the Y1 direction and retained there. At this time, the positioning arms 51 and 52 are rotated at position d. When the control member 31 moves in the X2 direction, the restricting pin 58 slides along the inclined portion 57e2 and arrives at a point on the boundary between the inclined portion 57e2 and the straight-line portion 57e3, as shown in FIG. 6B. At this time, the interlock lever 57 moves in the Y2 direction by the biasing force of the interlock spring 59. Here, the positioning arms 51 and 52 are rotated to their respective positions e. When the control member 31 moves further in the X2 direction from the position of FIG. 6B, the interlock lever 57 and each of the positioning arms 51 and 52 remain at the positions indicated in FIG. 6B.

A description will now be given of the operation of the above-described disk device.

A disk Da-containing cartridge C (such as that shown in FIG. 7A), or a disk Db (such as than shown in FIG. 7B) can be loaded into the disk device. The disks Da and Db have the same diameter, and their center holes D1 have the same inside diameter.

The cartridge, shown in 7A, has a shutter, which can slide in the Y1 direction, at the X1 side end thereof (or at the side towards which the cartridge C is inserted). The shutter S is biased in the closing direction (or Y2 direction) by a spring. When the shutter S slides in the Y1 direction, the window in the cartridge C opens, allowing a center hole D1 and a disk surface of the disk D to appear through the window.

Waiting State

In the waiting state, the moving member 7, provided at the upper housing portion 3, is at position g, or at the X2 side end of the guide 6. The moving member 7 is biased in the X2 direction by the resilient force of the ejection spring 13.

The control members 31 and 32 are coupled together by means of the gears 35 and 36 and the shaft 37 so as to operate in synchronism with respect to each other. In the initial state, both of the control members 31 and 32 move in the X1 direction. The lock releasing member 41 is biased counterclockwise by the lock spring 43 at position a. As shown in FIG. 4A, the lock pin 44, formed at the base end of the lock releasing member 41, is retained by the first retainer portion step 31d1 of the retainer portion 31d of the control member 31, and locked at a position where the control member 31 has reached as a result of moving in the X1 direction.

At this time, as shown in FIG. 6A, the restricting pin 58, provided at the X2 side end of the control member 31, moves into the valley 57e1 of the restricting portion 57e of the interlock lever 57. The interlock lever 57 goes against the pulling force of the interlock spring 59, and is retained at a position to where it has been pulled in the Y1 direction. This causes the positioning arm 51 to rotate counterclockwise by means of the rack 57b disposed at the Y1 side of the interlock lever 57, and the positioning arm 52 to rotate clockwise by means of the rack 57d disposed at the Y2 side of the interlock lever 57, as a result of which both of the positioning arms 51 and 52 are rotated to position d, causing the positioning pins 53 and 54 to move away from each other. Thus, the positioning pins 53 and 54 do not prevent insertion of the disk Db or the cartridge C.

In the disk device, the disk Db or the cartridge C is inserted from the opening 4 in the X1 direction by the manual slot-in method. In this method, the operator pushes the disk Db or the cartridge C into the device with his or her hand, when inserting either the disk Db or the cartridge C, without applying any electrical power to the restoring motor 38.

Disk Db Loading Operation

A description will first be given of the insertion of the disk Db.

The disk Db is inserted into the housing 1 from the opening 4, and then guided onto the lower guide walls 15a of the guide members 15 provided at both side plates 2b of the lower housing portion 2.

When the disk Db is inserted into the opening 4, an end of the disk Db bumps into the movable member 7 at position g. When the operator pushes the disk Db further into the device with his or her hand, the moving member 7 is pushed by an edge at the X1 side of the disk Db. As the disk Db is inserted into the disk, the moving member 7 slides along the guide 6 in the X1 direction. During this time, the wire 14 moves counterclockwise, causing the biasing pulley 10 to rotate counterclockwise. The small-diameter pulley 11, formed integrally with the biasing pulley 10, winds up the biasing wire 12, which stretches the ejection spring 13.

When the edge at the X1 side of the disk Db pushes the moving member 7 to position h of FIG. 3A, the moving member 7 starts to slide into the groove 41a of the lock releasing member 41 at position a. During the time in which the disk Db pushes the moving member 7 to position i, centering and clamping of the disk Db are performed successively.

When the moving member 7 is pushed in the X1 direction from position h, the lock releasing member 41, with the moving member 7 inserted in the groove 41a thereof, rotates clockwise by the force produced by pushing the disk Db. When the moving member 7 reaches position i, the lock releasing member 41 is rotated to position b. As shown in FIGS. 4A and 4B illustrating the rotation of the lock releasing member from position a to position b, the lock pin 44, provided at the base of the lock releasing member 41, moves away from the first retainer portion step 31d1 of the retainer portion 31d of the control member 31, and arrives at the second retainer portion step 31d2. Thus, the control member 31 is pulled by the coil spring 33 and moves only a short distance in the X2 direction. At this time, electrical power is not applied to the restoring motor 38, so that a light load is exerted on the gears 35 and 36. When the control member 31 moves in the X2 direction, the gear 35 is driven by means of the rack 31b, and the other gear 36 is driven to move the control member 32 along with the control member 31 in the X2 direction by the biasing force of the coil spring 34.

When the control member 31 moves through a short distance in the X2 direction from the position of FIG. 4A to the position of 4B, the restricting pin 58, affixed to the X2 side end of the control member 31, moves out of the valley 57e1 of the restricting portion 57e, as shown in FIGS. 6A and 6B. This causes the interlock lever 57 to move in the Y2 direction as a result of being pulled by the interlock spring 59. The control member 31 occupies the position of FIG. 6B, when the lock releasing member 41 is rotated to position b of FIG. 4B. In FIG. 6B, the restricting pin 57e is positioned at the boundary between the inclined portion 57e2 and the straight-line portion 57e3 of the restricting portion 57e. During the time in which the positioning arm 51 rotates from the position of FIG. 6A to the position of FIG. 6B, the interlock lever 57 is pulled in the Y2 direction by the interlock spring 59, so that the rack 57b allows the positioning arm 51 to rotate clockwise, and the rack 57d allows the positioning arm 52 to rotate counterclockwise, whereby the positioning arms 51 and 52 move from their respective positions d to their respective positions e.

When both of the positioning arms 51 and 52 rotate towards their respective positions e, the positioning pins 53 and 54, affixed to their respective positioning arms 51 and 52, move closer to each other, which produces a force that pulls in the disk Db in the X1 direction. As shown in FIG. 2A, the disk Db is centered by three component parts, that is the positioning pins 53 and 54 at their respective positions e and the moving member 7 at position i, so that the center hole D1 in the disk Db virtually matches the centers of the turntable 23 and the clamper 5.

Just before completion of the centering of the disk, the crank-shaped drive hole 31c in the control member 31 moving in the X2 direction, and the crank-shaped drive hole 32c in the control member 32 allow the corresponding pins 39 to be lifted upward, causing the unit chassis 21 to rotate upward on the supporting shafts 25 as fulcra. At about the time of or just after completion of the centering of the disk Db, the center hole D1 in the disk Db is clamped by the turntable 23 and the clamper 5.

Accordingly, during the time in which the lock releasing member 41 rotates from the position of FIG. 4A to the position of FIG. 4B, and during the time in which the positioning pins rotate from their respective positions of FIG. 6A to their respective positions of FIG. 6B, the disk Db is centered by the positioning pins 53 and 54, and the moving member 7, and clamped by the turntable 23 and the clamper 5. It is to be noted that when the lock releasing member 41 is at the position of FIG. 4B after completion of the centering and the clamping of the disk Db, the control member 31 moves further by a short distance in the X2 direction as a result of the pulling force of the coil spring 33. At this time, by the second restricting portion 31d2, being an inclined portion of the retainer portion 31d, shown in FIG. 4B, the lock releasing member 41 rotates slightly in the clockwise direction from the position b. Thus, the moving member 7, which is in the groove 41a of the lock releasing member 41, moves slightly in the X1 direction, and moves away from the clamped disk Db.

During the time in which the control member 31 moves slightly in the X2 direction from the position of FIG. 4B, the restricting pin 58, affixed to the control member 31, slides along the straight-line portion 57e3 of the restricting portion 57e, as shown in FIG. 6B. Therefore, the interlock lever 57 remains at the position of FIG. 6B. Consequently, the positioning arms 51 and 52 remain at their respective positions e. The disk Db is clamped as a result of being subjected to the centering force produced when the turntable 23 is rising. Since centering is performed during clamping of the disk Db, the center of the disk Db and the center of the turntable 23 match, and a peripheral edge of the centered disk Db moves slightly away from the positioning pins 53 and 54 and the moving member 7. Therefore, the disk Db is rotationally driven by the spindle motor 22, without bumping into the positioning pins 53 and 54 and the moving member 7. Thereafter, signals, recorded on the disk Db, are read by the optical head 24.

Loading of Cartridge C

A description will now be given of the operations involved in inserting the cartridge C of FIG. 7A.

Immediately after insertion of the cartridge C into the opening 4, the moving member 7, at the position g of FIG.

2A, is fitted to an end S1 of the shutter S. When the operator pushes the cartridge C further into the device with his or her hand, the moving member 7 is pushed and moves along the guide 6. When the moving member 7 moves along the oblique guide portion 6a of the guide 6, a component of force of movement in the Y1 direction of the moving member 7 is exerted onto the shutter S, causing the shutter S to slide in the Y1 direction. At the moment the moving member 7 arrives at an inflection point 6c between the oblique guide portion 6a and the straight-line portion 6b of the guide 6, the shutter S is completely opened. Thereafter, when the cartridge C is further inserted into the device, the moving member 7 slides in the X1 direction along the straight-line guide portion 6b of the guide 6.

When the moving member 7, moving along the straight-line guide portion 6b, arrives at position h of FIG. 3A, the moving member 7 slides into the groove 41a of the lock releasing member 41 at position a. As the moving member 7 moves in the X1 direction, the lock releasing member 41 rotates clockwise. When the cartridge C is completely inserted into the housing 1, the moving member 7 arrives at the X1 side terminal end of the guide 6, causing the lock releasing member 41 to rotate to position c.

When the lock releasing member 41 rotates from position a to position c, as the cartridge C is inserted into the housing 1, the lock pin 44, at the base of the lock releasing member 41, separates from both the first retainer portion step 31d1 and the second retainer portion step 31d2 of the control member 31, as shown in FIGS. 4A to 5. Thus, the unlocked control member 31 moves in the X2 direction by the resilient force of the coil spring 33, and the control member 32, in synchronism therewith through the gears 35 and 36 and the shaft 37, also moves in the X2 direction by the resilient force of the coil spring 34.

When the control members 31 and 32 move in the X2 directions, the crank-shaped drive holes 31c and 32c in their respective control members 31 and 32 allow the unit chassis 21 to be lifted up, and the center hole D1 in the disk Da in the cartridge C can be clamped by the turntable 23 and the clamper 5.

When the control member 31 moves in the X2 direction, the restricting pin 58, provided at the X2 side end of the control member 31, moves out of the valley 57e1 of the restricting portion 57e of the interlock lever 57, causing the interlock lever 57 to move in the Y2 direction by the biasing force of the interlock spring 59. Therefore, the rack 57b of the interlock lever 57 allows the positioning arm 51 to rotate clockwise, and the rack 57d allows the positioning arm 52 to rotate counterclockwise, so that the positioning pins 53 and 54 strike both sides of the cartridge C. At this time, the positioning pins 53 and 54 are resiliently pressed against the cartridge C due to the resilient force of the interlock spring 59.

When the cartridge C is completely inserted into the housing 1, as shown in FIG. 2A, the positioning arms 51 and 52 rotate to their respective positions f, and the positioning pins 53 and 54 move into their respective recesses C1 at both sides of the cartridge C, thereby positioning and retaining the cartridge C.

As described above, at the moment the cartridge C is positioned and retained in the housing 1, the shutter S already has been opened by the moving member 7, so that the center hole D1 of the disk Da, exposed as a result of opening the shutter S, is clamped by the turntable 23 and the clamper 5. Thereafter, reproduction is performed by means of the optical head 24.

Ejection Operation

In the disk device, as mentioned above, the disk Db or the cartridge C is inserted into the housing 1 by hand. The ejection, however, is performed by utilizing the power of the restoring motor 38.

Pressing an ejection button (not shown) causes electrical power to be applied to the restoring motor 38. The rotational output from the restoring motor 38 causes the gears 35 and 36 to start moving, and the rotational force of the gears 35 and 36 to be transmitted to the racks 31b and 32b, respectively, whereby the control members 31 and 32 are driven in the X1 direction.

When the control member 31 is driven in the X1 direction, the restricting pin 58, provided at the X2 side end of the control member 31, slides in the X1 direction along the inclined portion 57e2 of the restricting portion 57e of FIG. 6A, causing the interlock lever 57 to move back in the Y1 direction, and the restricting pin 58 moves into the valley 57e1 in order to retain the interlock lever 57.

When the interlock lever 57 moves in the Y1 direction, the positioning arm 51 rotates counterclockwise, and the positioning arm 52 rotates clockwise, so that the positioning pins 53 and 54 move away from the disk Db or the cartridge C, as a result of which the disk Db or the cartridge C is no longer positioned and retained. On the other hand, the drive holes 31c and 32c allow the unit chassis 21 to be lowered, so that the disk is unclamped from the turntable 23 and the clamper 5.

Thus, the disk Db or the cartridge C is pushed out from the opening 4 by the biasing force on the moving member 7 in the X2 direction caused by the pulling resilient force of the spring 13 of FIG. 2(A). During the time in which the moving member 7 moves to position h from the X1 side terminal end, the lock releasing member 41 rotates counterclockwise. During the time in which the lock releasing member 41 rotates to position a, the control member 31 returns back to its original position in the X1 direction, so that, as shown in FIG. 4A, the lock pin 44, at the base of the lock releasing member 41 rotated to position a, is fitted to the first retainer portion step 31d1 to lock the control member 31 at the initial position reached by the control member 31 as a result of moving in the X1 direction. At this time, the restoring motor 38 stops operating.

At the moment the cartridge C is ejected from the opening 4, the moving member 7 is back to position g, as a result of which the shutter S is closed.

As can be understood from the foregoing description, since the movement stroke of the moving member can be made long, and the moving member can be stably moved by guiding it along a guide, the shutter can be reliably opened, and ejected with a sufficiently long ejection stroke.

In particular, affixing the moving member to a wire, and subjecting this wire to an increasing biasing force output of the biasing member allows a proper amount of biasing force to be applied to the moving member, and a reduction in the amount of reaction force produced when the cartridge is being inserted into the device, allowing smooth insertion.

A cartridge as well as a disk, not contained in a cartridge, may be inserted into the device.

What is claimed is:

1. A disk device for receiving through an opening, selectively, both a disk not contained in a cartridge and a cartridge containing a disk; wherein said cartridge includes a shutter for opening and closing a window to expose a portion of said disk, the shutter faces an inner back side of said disk device, an opening direction of the shutter is set in the widthwise direction of said disk device; said disk device comprising:

- a guide having an oblique guide portion and a straight guide portion, said oblique guide portion extending obliquely at an angle through the widthwise direction center portion of said disk device from the opening towards the inner back side of said disk device, and in the opening direction of the opening shutter, and said straight guide portion extending continuously from said oblique guide portion towards the inner back side of said disk device;
- a moving member which contacts with said cartridge containing a disk or said disk not contained in a cartridge when inserted into said disk device and thereby moves along said guide towards the inner back side of said disk device;
- a biasing member for biasing said moving member towards the opening; and
- positioning members for positioning both the cartridge containing a disk or the disk not contained in a cartridge to a position where the disk is drivable,
- wherein said moving member is moved with the cartridge to the inner back side of said disk device and thereby engages one end of said shutter of said cartridge to open said shutter.

2. The disk device according to claim 1, further comprising a wire which is loosed around a plurality of pulleys, and a portion of said wire extends along said guide, said wire moves along said guide, said wire having said moving member affixed thereto, and said wire being biased in a direction that allows said moving member to move towards the opening side.

3. A disk device according to claim 2, further comprising a biasing pulley having said wire wound thereupon, and a small-diameter pulley which rotates with said biasing pulley, and having a biasing torque, produced by a biasing force of said biasing member, exerted thereto.

* * * * *

UNITED STATES PATENT AND TRADEMARK OFFICE
CERTIFICATE OF CORRECTION

PATENT NO. : 6,052,351  
DATED : April 18, 2000  
INVENTOR(S) : Tatsumaro Yamashita et al.

It is certified that error appears in the above-identified patent and that said Letters Patent is hereby corrected as shown below:

<u>Title page,</u>  
Item [56], References Cited, U.S. PATENT DOCUMENTS, insert  
-- 5,119,358    6/1992    Soga    369/77.2 --.

<u>Column 14,</u>  
Line 12, change "loosed" to -- looped --.

Signed and Sealed this

Sixth Day of August, 2002

Attest:

Attesting Officer

JAMES E. ROGAN  
Director of the United States Patent and Trademark Office